United States Patent [19]

Lechnir

[11] Patent Number: 5,042,962
[45] Date of Patent: Aug. 27, 1991

[54] BARREL MOVER

[76] Inventor: Alfred M. Lechnir, P.O. Box 6917, Gulfport, Miss. 39506

[21] Appl. No.: 187,863

[22] Filed: Apr. 29, 1988

[51] Int. Cl.$^5$ .............................................. B62B 1/06
[52] U.S. Cl. .................................... 414/452; 414/469
[58] Field of Search ............... 414/444, 447, 450, 451, 414/452, 457, 469, 456, 619, 622; 280/47.27, 47.28, 47.29

[56] References Cited

U.S. PATENT DOCUMENTS

| | | | |
|---|---|---|---|
| 2,028,976 | 1/1936 | Goff | 414/450 |
| 2,272,447 | 2/1942 | Traxel | 414/450 |
| 2,485,085 | 10/1949 | Burch | 414/456 X |
| 2,651,428 | 9/1953 | Dickson | 414/622 |
| 3,278,061 | 10/1966 | Christensen | 414/456 |

FOREIGN PATENT DOCUMENTS 120657  6/1918  United Kingdom ............ 280/47.29

Primary Examiner—Joseph E. Valenza
Assistant Examiner—Keith L. Dixon
Attorney, Agent, or Firm—Alexander Norcross

[57] ABSTRACT

A hand truck particularly adapted for the movement of extremely heavy barrels has a wheeled base platform to which is pivotally attached a barrel holding frame having a forward vertical position and a braced reclining position against the truck. The barrel frame has its pivot point located at a sufficiently forward and low position so as to achieve approximately a ninety to one lever arm from the truck handle to the pivot point. The barrel frame has two lower barrel holding hooks. A pivoted barrel grasper, a lever arm having a pair of offset, facing grabber hooks, is positioned by means of a moveable pivot pin so as to engage the top lip of a barrel. In use, the barrel truck is moved in the erect position adjacent to a barrel; the grasper is positioned so that the grabber hooks enclose the upper rim of the barrel. A downward motion on the lift arm, over the extended lever arm provided clasps the edge of the barrel, lifting it slightly and permitting the bottom support hooks to be slid under the bottom edge of the barrel. The lifting lever arm is then released and a sliding barrel lock hook locks the upper edge of the barrel to the barrel frame. The frame and barrel then may be tilted to a moving position; the separate frame pivot axis creates a large lever arm a single individual, working against a practical handle height, may tilt over a barrel weighing to 1,500 pounds. The barrel frame, when tilted, is supported entirely upon the truck which may then be manipulated to move the barrel to a new location. No strength is required on the part of the individual to support the tilted barrel during the movement process.

4 Claims, 3 Drawing Sheets 5,042,962

BARREL MOVER

BACKGROUND OF THE INVENTION

Cylindrical barrels have, for a considerable period of time, been a standard method of holding and moving merchandise in the industrial environment. Substantially all liquid and granular raw materials are provided and shipped in these barrels, to the extent that the standard oil drum, a steel barrel of some three foot height, capable of containing liquid contents of forty two gallons, has become a nearly universal size and shape standard for containers. As a result, such cylindrical drums usually made of steel or fiber material, have become a staple item of commerce. Because of their innate strength, low cost and volumetric efficiency, they have also become widely used for the holding and movement of intermediate products in the manufacturing industry, especially in the metal products field, where such drums are used as temporary holding containers for small and medium sized metal products, including castings, forgings, and products in the process of machining.

A typical liquid filled barrel or drum, such as the universally encountered oil drum, contains forty-two gallons of liquid, having a density slightly less than water; an alternate and almost as widely available drum is a fifty-five gallon barrel. Such drums come filled with products having densities in the range of six to eight pounds per gallon, and typically weigh between 300 to 500 pounds. Inasmuch as this is well beyond the strength which a single individual can safely lift, and approaches the maximum possible lifting load for two average men, numerous hand dolly and trucks have been devised for purpose of lifting and moving a single drum container.

All such hand trucks must accomplish several basic functions. The first is that the hand truck must somehow grasp and assist in tilting the barrel to a position where it is lifted from a floor for the purposes of moving. The truck must then hold the barrel so as to prevent its falling free during the course of movement, and the truck must somehow provide that a single average human manipulator can, exerting a reasonable amount of force, control and move the barrel and truck combination at whatever expected weight (mass) the total combination achieves.

The essential structure of a hand truck, old in the art, is of a vertical member against which the barrel is secured and rests, at least one pair of wheels so that the truck may be easily moved across uneven surfaces, and a handle for manipulating the same. In order to secure the barrel to the hand truck, it has become common to use any of a number of mechanisms for grasping the upper lip of the barrel and holding this in a fixed position against the frame of the truck. Thus, U.S. Pat. No. 1,513,863, to Sabin, shows an early form of barrel clasp having a fixed upper clasp which grips against the inner circumference of the rim of the barrel against the force of two spring loaded lifting members, which, activated by a short lever arm, are driven against the bottom edge of the out rim of the barrel; the combination holds the barrel against the vertical frame.

A later form of such a structure is shown in U.S. Pat. No. 2,447,300 to W. A. Williams, in which the bottom member is a fixed, partially circumferential edge and the outer lip of the barrel is held on to the top of this edge by a spring loaded outwardly acting hook member.

U.S. Pat. No. 1,510,456 discloses a structure in which an upper hook is looped over the rim of the barrel, and a pivoting lever arm on the hook forces a lower dog into lifting contact with the bottom surface of the outer rim of the barrel.

An inverted form of much the same structure is shown in U.S. Pat. No. 3,815,767 in which a spring loaded hook, the spring reacting through a lever arm, is engaged with the bottom surface of the outer rim of the barrel.

Double acting clasping hooks are shown in U.S. Pat. No. 2,616,577 to Barrett in which a cooperating spring loaded upper hook for grasping the inner edge of the rim of the barrel and a cooperating lower dog, also spring loaded, reacts against the bottom surface of the outer rim of the barrel. The entire comprises a self-contained structure which then may be vertically positioned along the frame of the lift truck for adapting to and clasping varying heights of barrels.

U.S. Pat. No. 2,272,447 discloses a second form of cooperating upper hook and lower lifting dog in which an eccentric offset on the pivot bearing for the upper hook is used to cause the upper hook to lower and then contract against the lifting dog to more securely fasten the barrel.

Most such devices use the lower dog or hook, set against the outer rim of the barrel, for the purposes of vertically restraining the barrel. All such trucks use the tilting motion of the lift truck, the barrel being so secured against the lift truck, to break the barrel free of the ground for movement. The great majority of current lift trucks pivot around a single provided front wheel pair, although Sabin discloses a truck frame in the form of a tricycle having a rear wheel which rests against the ground, limiting the rearward tilt of the truck.

Fiber drums, unlike steel drums, have no strong rim with a lip suitable for applying a lifting force. Two hand trucks, rather than using the lifting effect of a securing dog against the upper rim of the barrel, show the use of a hook to restrain the barrel against tilting away from the truck, and use a form of support or extension under the bottom edge of barrel to provide the lifting effect. These are U.S. Pat. No. 1,913,295 to Schreck and U.S. Pat. No. 2,485,085 to Burch. Burch also shows the use of an independent pivot axis, offset from the wheel axis for the truck. In Burch, the independent axis would cause the structure to fail to lift entirely were it not for the use of an intermediate stop or torsion spring and counter-balancing mechanism which converts the movement of the tilt frame to rotation about the wheel axis; thus, in order for the hand truck of Burch to physically lift the barrel from the ground, the lever arm of rotation is still about the wheel axis.

Schreck also discloses that of the class of hand trucks having a support under the barrel for lifting, the barrel must somehow be tilted forward in order to insert the support under the barrel.

SUMMARY OF THE INVENTION

The invention discloses a novel lift truck having, in combination, several features designed to overcome two major difficulties with the hand trucks of the prior art. The first is that for those hand trucks using a cooperating lifting hook and dog, the entire weight of the barrel suspends from the lifting dog down through a generally telescoping structure along the vertical frame of the truck. This, of necessity, severely limits the total weight that can be moved by such a lift truck without providing a lift truck structure of such mass and weight as to be unwieldy. Since the purpose of a lift truck is to provide an assistance device so that a single individual can manually manipulate a barrel, such an increase in weight is self-defeating.

For those lift trucks which have bottom supports under the rim of the barrel for lifting, as in Schreck and Burch, no adequate mechanism exists for tilting the barrel so as to permit the lifting lugs or wedges to be fully inserted beneath the barrel. Since the security of suspension of the barrel on such a lift truck is totally dependent on its correct positioning on the support, this can result in an unsafe situation where a partially secured barrel breaks free, endangering both the user and those around the barrel.

Finally, all the structures shown involve a distinct conflict in the forces that can be applied in the process of tilting and supporting the load. All these structures pivot the load around the wheel axis for the supporting ground contact wheel. Even Burch places the load upon the wheel axle in order to bread the barrel and hand truck free of ground contact for movement.

The uneven concrete surface encountered in an industrial environment mandate that, within reason, the ground wheels be as large in diameter as possible inasmuch as the force required to cross an uneven bump in the surface is through a direct lever arm which improves with the increase in diameter of the wheel. However, this increase in wheel diameter to allow the load to be readily moved across an uneven floor surface equally increases the force required for the user to break over and carry the resulting load. The result is a compromise between ease of movement and ease of manipulation of the load.

The overall lever arm available to the user to provide a mechanical advantage for tilting and lifting the barrel is that lever arm extending from the handles to the point of rotation around the wheel axis of the lift truck; this is a fixed quantity in any particular wheel truck design. In any event, this distance is limited by the fact that the wheel truck must be adapted to the height and arm reach of the average user, who, in order to maintain proper control of these heavy loads should not be required to reach over his head or otherwise stretch into a position where balance and control are marginal.

It is for this reason that typical hand lift trucks of the prior art become extremely dangerous when an attempt is made to use them to move barrels commonly encountered in the metal products trade, as such barrels have commonly been used to hold and move loads ranging up to 1,500 pounds.

The instant invention discloses a lift truck of novel design in which a fixed bed truck is provided, having a barrel lifting frame pivoted around a separate axis placed closer to the ground than that feasible for a ground wheel axle; this increases the achievable lever arm for tilting and manipulating the barrel to a lever arm substantially greater than that of the prior art lift trucks; an increase in lever arm to 90:1 can be readily achieved.

In addition, in order to safely handle extraordinarily heavy barrels, a structure is shown in which a barrel bottom rim support is used so as to distribute the weight of the barrel onto the support frame. An innovative lever arm lifter with, offset counteracting clamps is shown for the purpose of initially tilting the barrel to permit the lips to be carefully and completely placed underneath the bottom edge of the barrel. The clamps distribute the lifting force, and thus are usable for both rimmed and rimless drums. The structure of the lifter lever arm is such that it can be manipulated into a second position and a sliding hook member used to secure the barrel against the tilt frame. Since the design of the lift truck separates the tilt geometry of the barrel holder to a separate axis, the wheels and wheel axis on the truck may be designed for maximum ease of maneuverability over rough ground or obstacles. Thus, substantially large wheels may be used to reduce the force necessary to move the truck even with barrels of weight significantly greater than that can be safely handled by the prior art lift trucks.

The entire combination provides a lift truck of significantly increased safety with ordinary barrels and which is capable of handling barrel of significantly greater weight than hand trucks of prior design.

It is, thus, an object of this invention to show a lift truck that, in combination, can safely tilt and secure a barrel of significantly greater weight than that in the prior art.

It is a further object of this invention to show a lift truck which is capable of easy movement over rough or broken ground without decreasing the lever arm available to the user to manipulate heavy barrels.

It is a further object of this invention to show a lift truck having a unique means for placing a barrel upon support members/for ease of movement.

It is a further object of this invention to show a barrel mover which more positively secures the barrel against accidental movement or falling while in transit.

These and other objects of the invention may be more clearly seen from the detailed description of the preferred embodiment.

DETAILED DESCRIPTION OF THE PREFERRED EMBODIMENT

Figure 1:
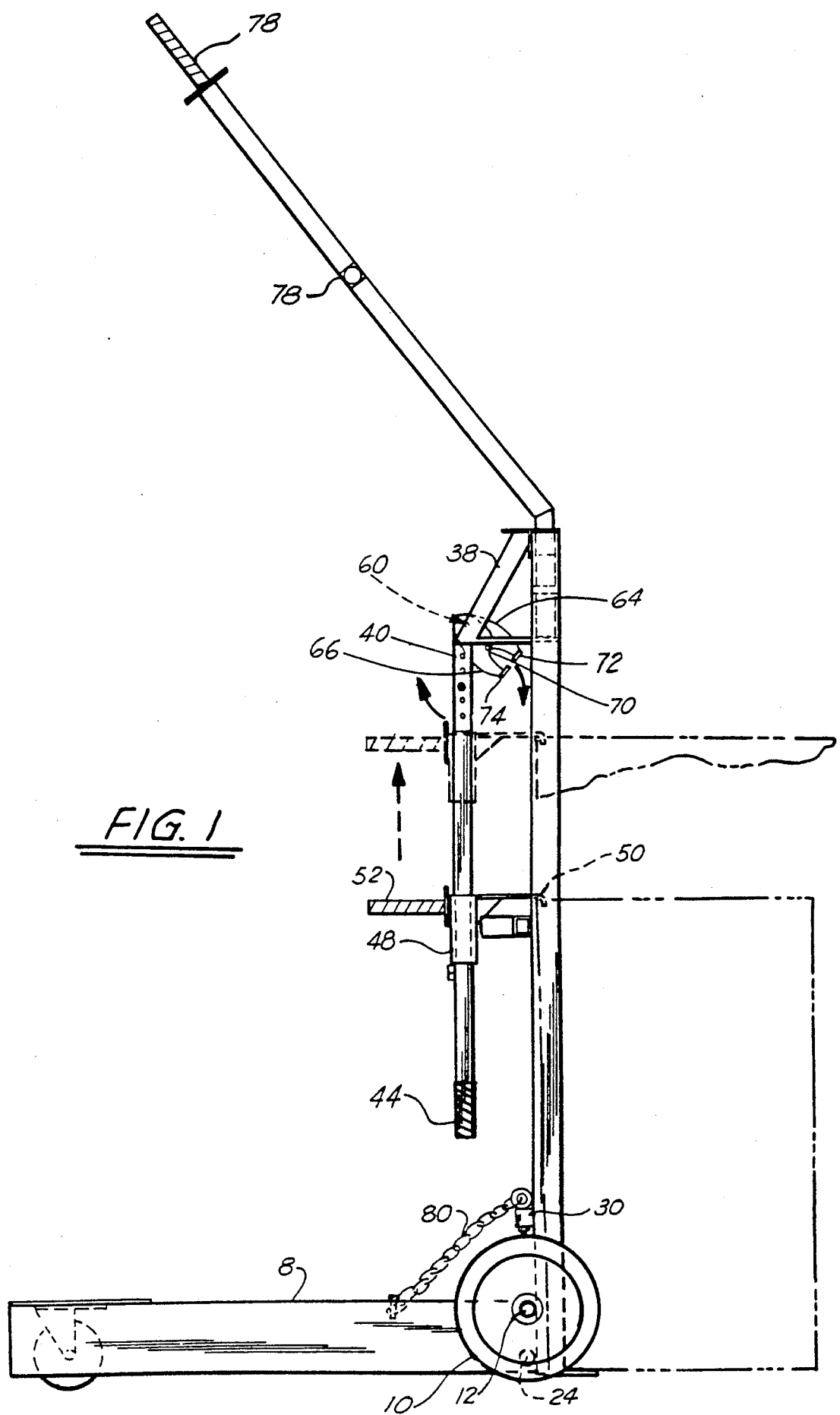
FIG. 1 shows the barrel mover in side view.
Figure 2:
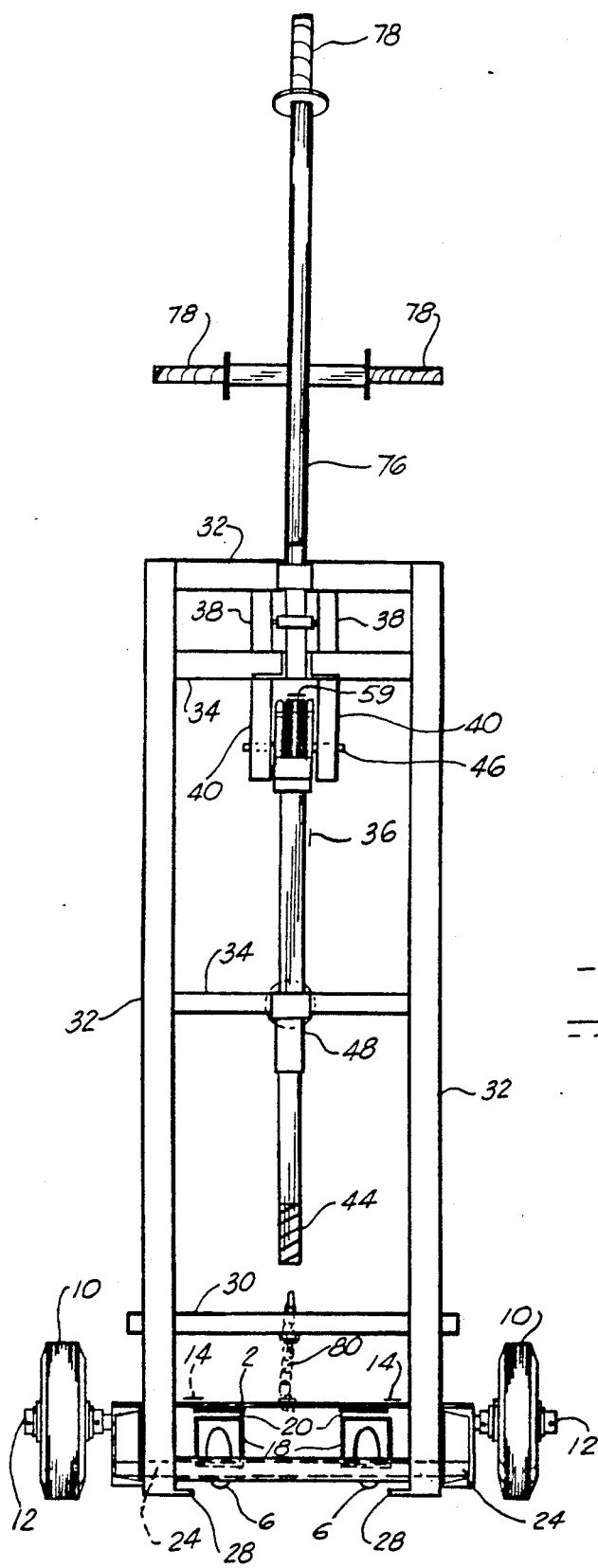
FIG. 2 shows the barrel mover in front view.
Figure 3:
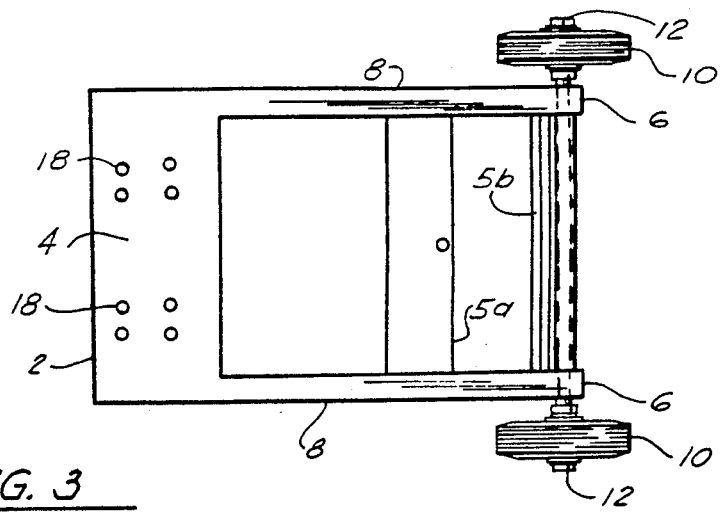
FIG. 3 is a top view of the truck platform, the barrel support frame being removed for clarity.
Figure 4:
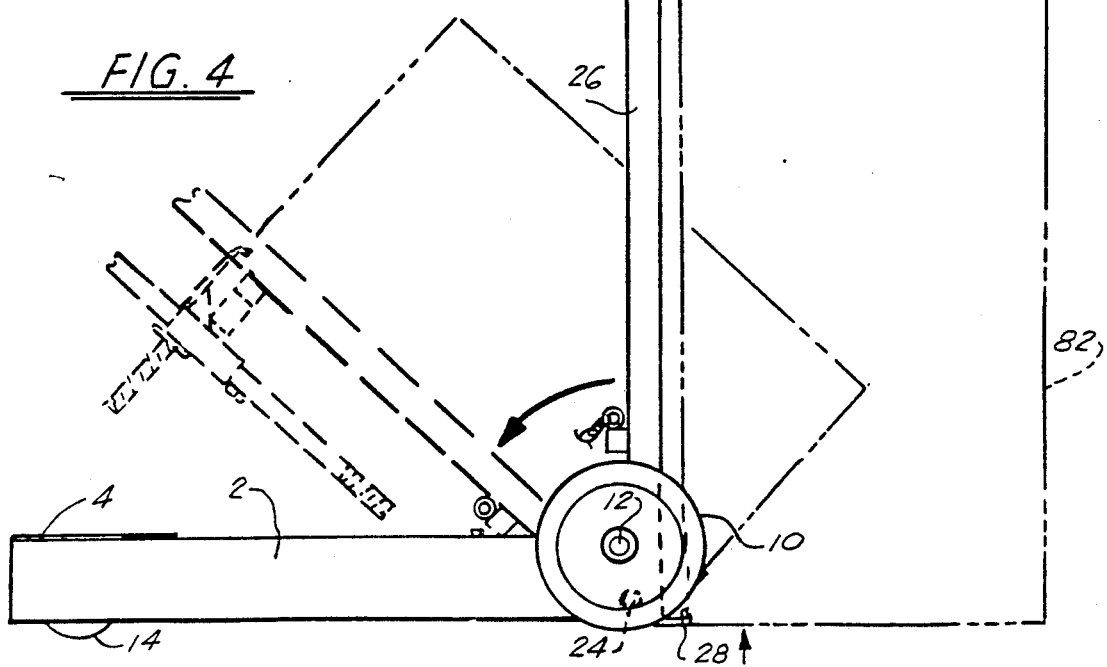
FIG. 4 is a side view illustrative of the lifting and breakdown of a drum.

Referring to FIG. 1 and FIG. 2 in combination, the major structural components of the invention are seen to be first a base platform 2, which is shown in FIG. 3 to be a substantially rectangular structure having a rear end 4, a front end 6, and sides 8. The combination providing a substantially strong box frame riding upon a pair of journaled front wheels 10 which are journaled along an axle line 12, at the front end 6 of the base platform. In order to provide for mobility and steering, a smaller pair of swivel caster wheels 14, are installed adjacent the rear end 4 of the platform. The swivel caster wheels 14 are of a common design in the industrial platform trade and preferably consist of that style of swivel caster wheel which is an individual wheel 16 journaled within a box frame 18, the box frame 18 being affixed through a pivoting load bearing 20 to the rear end 4 of the base platform.

Base platform 2 comprises the principal load bearing, floor contacting member of the invention. Pivotally affixed to base platform 2 at a separate pivot axis 24 is pivotally affixed drum support frame 26; this is the second major sub-component of the truck. Drum support frame 26 is a substantially rectangular frame adapted to receive and support a drum, whether fiber or metal; at a bottom end of drum support frame 26, below pivot axis 24, are found barrel hooks or drum supports 28. Preferably two such barrel hooks exist, and each is a substantially flat, wide metal plate affixed, as by welding, to the bottom of drum support frame 26, and each is adapted to support the outer rim of a drum 82.

At a point above pivot axis 24 vertically along drum support frame 26 is found frame brace 30. Brace 30 is a substantially strong rectangular brace extending across the entire width of drum support frame 26 and for a distance outside vertical side member 32 of drum support frame 26. Frame brace 30 is a substantially rectangular structure of some thickness and extends outward so as cover each base platform side 8. Frame brace 30 is vertically positioned so as to contact side 8 at an approximately 45 degree angle tilt of support frame 26; an angle determined by a worst case assumption by a heavy load centered in the lowest 16" of drum 82.

Vertical side members 32 by contrast are spaced a distance apart so as to ride within a base plateform opening contained within side ends 8. Base platform opening is maintained against the forces and weight of a loaded drum support frame 26 by means of center cross brace 5A and front structural brace 5B, both of which are installed at a height equal to or below that of pivot axis 24. By contrast, base platform sides 8 are of a substantial vertical thickness for strength and also to provide support for both front wheel axle 12 and drum support frame pivot axis 24 which are essentially vertically aligned, the wheel axle 12 being substantially above pivot axis 24.

Figure 5:
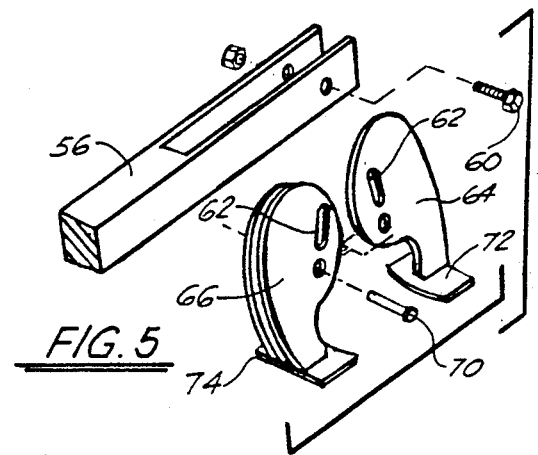
FIG. 5 is an exploded view of the lifting clamp jaws.
Figure 6:
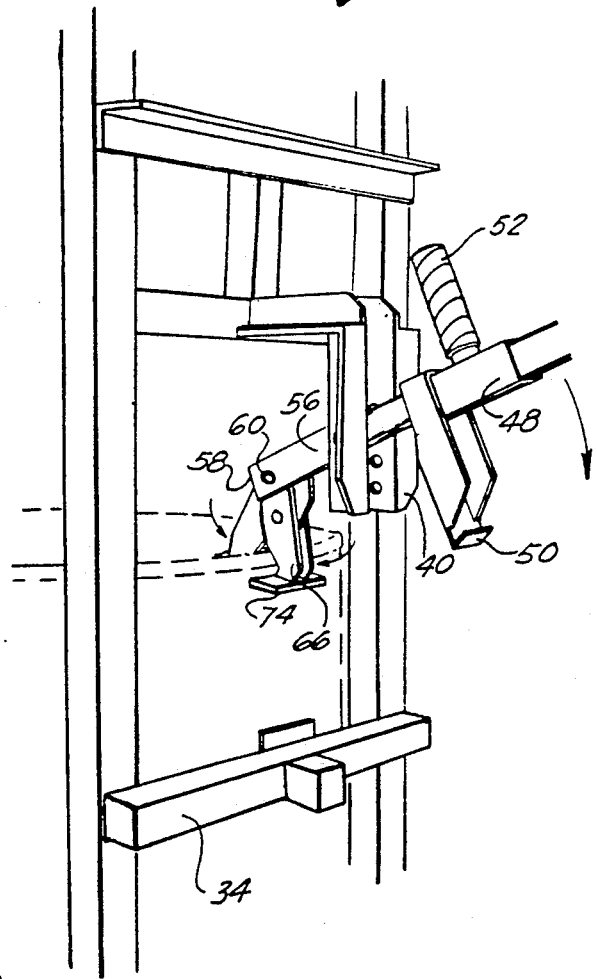
FIG. 6 is a detail view of the barrel manipulator assembly, the triangular support frame being not shown for clarity.

For rigidity, drum support frame 26 is provided with a plurality of cross braces 34 at a spaced relationship vertically along and between side members 32. Two such cross braces 34 are closely provided in a spaced apart relationship at the top of drum support frame 26. Attached to these upper two cross braces 34, at a center location, and extending behind from support frame 26, is barrel manipulator assembly 36. Barrel manipulator assembly 36, in side view, can be seen to comprise triangular support frame 38 from which descends split barrel clamp adjustment beam 40. Note that frame 38 is omitted from FIG. 6 to more clearly show the remaining structure. The barrel clamp adjustment beam is a split beam having two, a left and a right, beam members provided with a plurality of spacing holes 41 for the purpose of adjusting the height of barrel manipulator 36. Barrel manipulator 36 is shown in detail in FIG. 5 and may be seen in front view in FIG. 2. Taking these Figures in conjunction with FIG. 1, barrel manipulator 36 can be seen to be lever arm 44 which is pinned by means of adjustment pin 46 between an adjacent pair of adjustment holes 41 in barrel clamp adjustment beam 40. Lever arm 44 pivots about adjustment pin 46. Slideably engaged upon lever arm 44 is barrel rim hook 48, having a fixed hook member 50 extending forward into the area of drum support frame 26, and equipped with hook manipulating handle 52 to allow barrel hook 48 to be easily slid vertically along lever arm 44 when lever arm 44 is pivoted to a vertical downward position.

Adjustment pin 46 along lever arm 44 creates a classic lever arm having a long arm end 54 along which barrel hook 48 slides and a short arm end 56 extending from adjustment pin 46 to the upper end 58 of manipulator 36. Upper end 58 of manipulator 36 is a forked end provided with a drum or barrel clamp pivot pin 60. Barrel clamp pivot pin 60 extends through upper end 58 of lever arm 44 and through elongated pin slot on inner barrel clamp jaw 64 and outer barrel clamp jaw 66. Inner and outer barrel clamp jaws are comprised of symmetrical pivot plate(s) an essentially elongated plate having a jaw connection pivot pin 70 through which pivot pin 70 extends, interconnecting inner jaw 64 and outer jaw 66 which pivot with respect to each other about pivot pin 70. In order to intermesh inner clamp 64 and outer clamp jaw 66, one of the two jaws, typically outer clamp jaw 66 is provided with two parallel pivot plates 68, having an intermediate space within which fits the single pivot plate 68 of inner clamp jaws 64. At the bottom of pivot plate 68 of inner clamp jaw 64 is a convex clamping plate 72, extending for a width substantially perpendicular to the orientation of barrel manipulator 36. Likewise, outer clamp jaw 66 terminates in a substantially perpendicular concave clamping plate 74. When the jaws are interconnected through pivot pin 70, convex clamping plate 72 and concave clamping plate 74 are positioned such that their concave and convex faces meet symmetrically and with gripping force.

Pin slot 62 within each of pivot plate 68 is an elongated structural slot for loosely encompassing barrel clamp pivot pin 60, but set at an angle extending from a first end towards clamping plate 72 or 74 upwards, tilted in a direction toward the corresponding other clamp jaw pivot plate. An upward motion of pivot pin 60 in the slots 62 thus rotates each clamp jaw about pivot 70 so as to force clamping plates 72, 74 together. A downward motion of pivot pin 60 separates the jaws.

For the purposes of manipulation of the overall truck, a typical cross handle assembly 76, is mounted by means of a standard swivel mount to the upper end of drum support frame 26. This swivel mount is any sufficient pipe swivel mount of those well known in the art for supporting a handle, permitting the handle to be swiveled at an angle to drum support frame 26 and then locked into position. Cross handle assembly 76 is preferably equipped with three individual handles 78 to permit increased ease of grasping the handle assembly from any position adjacent to the lift truck. Cross handle assembly 76 is further angled by being bent with respect to drum support frame 26 so as to increase the ease of grasping one of the handles 78.

In use, drum support brace 26 is moved to a substantially vertical position; it is restrained from over movement by means of safety chain 80. It is placed next to a barrel 82 to be moved.

Barrel 82 may be either a fiber or a metal drum or barrel and contain contents, such as metal castings or fittings which weigh in excess of 1,000 pounds. By means of the placement of adjustable pin 46 within barrel clamp handle 42, barrel clamp handle 42 is positioned so that when in a horizontal position, it is slightly above the upper rim 84 of drum 82. Inner clamping jaw 64 is then placed against the inner portion of upper rim 84 and outer barrel clamp jaw 66 is placed adjacent the outer portion of upper rim 84 of the barrel. A downward motion on long arm end 54 of barrel clamp handle 42 then forces barrel clamp pivot pin 60 upwards within pin slot 62. Inasmuch as pin slots 62 are angularly offset with respect to each other, the movement of clamp pivot pin 60 forces rotation of inner barrel clamp jaw 64 and outer barrel clamp jaw 66 around pivot pin 70 which fastens the two jaws together. This then drives convex clamping plate 72 and concave clamping plate 74 together against the upper rim 84 of the barrel and transmits a significant portion of the lift force into clamping force. It is found that clamps of this design are capable of clamping either to a steel or to a fiber barrel whether such a drum has a rolled rim or an essentially smooth rim. In contradistinction to the prior art there is no necessity to place a dog or a contact surface beneath a rolled rim of a barrel to exert a significant upward force. Further downward motion upon barrel clamp handle 42 lifts slightly drum 82 and, at the same time, since the entire barrel clamp assembly 59 comprising inner clamp jaw 64 and outer clamp jaw 66 tends to move in an arc upward and into drum support frame 26, the force readily moves base platform 2 towards barrel 82. This effect requires that drum support frame 26 not tilt significantly towards the barrel from a vertical position, and restraint chain 80 secures frame 26 against overcenter extension.

Thus, the lifting force also moves base platform 2 against drum 82; and as barrel 82 lifts, moves barrel hooks 28 under the bottom of barrel 82. Once barrel 82 has been lifted and placed upon the barrel hooks by this single motion, lever arm 44 is released lowering barrel 82 onto the barrel hooks. The barrel clamp jaws 64, 66 then release from this downward motion and lever arm 44 is rotated to a vertical position. Barrel hook 48 is then manipulated by means of manipulating handle 52 vertically along lever arm 44 until barrel hook member 50 can be lowered over drum upper rim 84 clamping drum 82 to the drum support frame 26.

Manipulation of handle 78 then tilts drum support frame 26 backwards against base platform 2 about the support frame pivot axis 24. Since pivot axis 24 is independent of and below front wheel axis 12, a significant increase of lever arm can be achieved for lifting and tilting a heavy barrel. Lever arm increases as much as three to one have been attained with respect to standard trucks which tilt about their wheel axis. A lever arm of 90:1 can be readily achieved. Drum frame 28 is then tilted until frame brace 30 rests in the contacts with platform side beams 8. In this position all the weight of the barrel and drum support frame rest directly upon the platform and there is no necessity for the user of the truck to exert any force to hold the barrel 82 up.

It is then an easy maneuver for a user, grasping one of handles 78, to move the barrel and truck combination to a desired location. Inasmuch as the front wheel axle 12 is separate from the point of pivot of the drum support frame, the positioning of the axle 12 and the diameter of the front wheels 10 may be made sufficiently large so as to permit easy movement of the truck over rough or disjointed floor surfaces. Since the center of gravity of the barrel is substantially over front wheels 10 most of the load is on the front wheels 10 and thus the caster wheels 14 may be smaller without unduly inhibiting the transportability and mobility of the truck. The entire truck is substantially narrower than forklift, permitting use in aisles only slightly wider than the barrel.

It is thus possible to have substantially larger front wheels 10 which are easier to move under heavy loads across a broken area.

When the barrel has been manipulated to a desired unloading point, the process is reversed. A lifting motion upon handle 78 against the extended lever arm of the drum support frame 26 readily moves drum support frame 26 to a vertical position. Over-travel is further restrained by chain 80. Once drum 82 is resting in a vertical position, it will be resting upon both the floor surface and upon the barrel hooks 28 of the truck. Barrel hook 48 is then raised and lever arm 48 manipulated so as to again grasp the upper rim 84 of the barrel with the barrel clamp assembly 59. The barrel is then slightly raised again and a slight tugging motion on handle 78 removes the barrel hooks from under drum 82 which may then be lowered to its desired position on the ground.

It is found that the use of the independent barrel manipulator assembly 36 to lift the barrel onto the barrel hooks and then to clamp the barrel to the drum support frame 26 permits much heavier barrels to be manipulated with a hand truck than could be previously handled by tipping the barrel or by using a fixed jaw assembly to grasp around the upper end of the barrel and then using a tilting force about the axis of the wheels of the truck to tip the barrel.

It is further found that by separating the axis of rotation of the ground contact wheels from the pivot axis of the barrel frame assembly, that a much improved lever arm, and therefore mechanical advantage can be achieved for tipping heavy barrels into a transporting position and returning them to a vertical storage position, while not reducing the overall mobility and transportability of the truck.

It is thus apparent that the instant invention covers not only the preferred embodiment disclosed but also those equivalents as are claimed.

I claim:

1. In a hand truck for drums having an upper rim:
  a. a truck base platform;
  b. first and second wheel means, axially journaled to said platform for rolling motion across a surface;
  c. a drum support frame pivotally affixed to said platform;
  d. said drum support frame having a first substantially vertical and a second substantially inclined position with respect to said platform;
  e. one or more lower drum supports extending outward adjacent a lower end of said drum support frame;
  f. means for lifting said drum relative to said drum support frame onto said drum supports;
  g. means for securing said drum rim against said drum support frame; and
  h. a lever arm means for manipulating said drum support frame between said first and said second position the means for lifting the drum relative to the drum support frame further comprising:
  a first inner rim gripping jaw, having a convex face adaptable to the inner curve of the rim of a drum;
  a second outer gripping jaw, having a concave face adaptable to the outer curve of the rim of a drum;
  said first and said second gripping jaws being offset pivotally mounted to one end of the lever arm means;
  said offset pivot forcing said convex face against said concave face upon application of a vertical force to said first and said second jaws through said lever arm means;

said lever arm means being pivotally affixed to said drum support frame; and means for adjusting the point of pivotal attachment of said lever arm means vertically with respect to said drum support frame.

2. In a hand truck for drums having an upper rim:
a. a truck base platform;
b. first and second wheel means, axially journaled to said platform for rolling motion across a surface;
c. a drum support frame pivotally affixed to said platform;
d. said drum support frame having a first substantially vertical and a second substantially inclined position with respect to said platform;
e. one or more lower drum supports extending outward adjacent a lower end of said drum support frame;
f. means for lifting said drum relative to said drum support frame onto said drum supports;
g. means for securing said drum rim against said drum support frame; and
h. a lever arm means for manipulating said drum support frame between said first and said second position said means for securing further comprising:
a hook, slidably engaged along said lever arm means;
said hook extending outward of said drum support frame when the lever arm means is in a substantially vertical position;
said hook engaging the upper rim of said drum contactingly against said drum support frame.

3. In a hand truck for drums of the type having a drum support frame having a lower support means for supportingly engaging the lower rim of a drum:
means, positioned upon said drum support frame for lifting said drum relative to said lower support means comprising:
  a. a first inner rim gripping jaw, having a convex face adaptable to the inner curve of the rim of a drum;
  b. a second outer gripping jaw, having a concave face adaptable to the outer curve of the rim of a drum;
  c. said first and said second gripping jaws being offset pivotally mounted to one end of a lever arm;
  d. said offset pivot forcing said convex face against said concave face upon application of a vertical force to said first and said second jaws through said lever arm;
  e. said lever arm being pivotally affixed to said drum support frame; and
  f. means for adjusting the point of pivotal attachment of said lever arm vertically with respect to said drum support frame.

4. The apparatus as described in claim 3 above further comprising;
  a. a hook, slidably engaged along said lever arm;
  b. said hook extending outward of said drum support frame once the lever arm is in a substantially vertical position;
  c. said hook engaging the upper rim of said drum contactingly against said drum support frame.

* * * * *